United States Patent [19]

Staley, 3rd

[11] Patent Number: 4,742,921
[45] Date of Patent: May 10, 1988

[54] CONVEYOR SYSTEM

[76] Inventor: Wilford Staley, 3rd, c/o Eastern Conveyor Co., Inc., Philadelphia, Pa. 19124

[21] Appl. No.: 15,233

[22] Filed: Feb. 17, 1987

[51] Int. Cl.$^4$ ............................................. B07C 5/00
[52] U.S. Cl. ................................... 209/539; 108/457
[58] Field of Search .............. 209/538, 539, 540, 583, 209/576, 552; 198/417, 457, 493, 428

[56] References Cited

U.S. PATENT DOCUMENTS

| 1,444,919 | 2/1923 | Hoy. | |
|---|---|---|---|
| 2,499,694 | 3/1950 | Stenger | 198/31 |
| 3,776,344 | 12/1973 | Harrison | 198/20 |
| 3,882,992 | 5/1975 | Van Linder et al. | 198/457 |
| 4,193,491 | 3/1980 | James et al. | 198/476 |
| 4,411,350 | 10/1983 | Wolfram | 198/417 |
| 4,567,988 | 2/1986 | Weibel | 209/583 |

FOREIGN PATENT DOCUMENTS 297640  3/1954  Switzerland ................. 198/457

Primary Examiner—James B. Marbert
Attorney, Agent, or Firm—Z. T. Wobensmith, III

[57] ABSTRACT

A conveyor system which receives stacks of articles in an upright position, such as boxed tape cassettes, which are deposited in stacks on a first endless belt, carried to a transition area where they are picked off one at a time, turned ninety degrees and deposited on another endless belt which carries them to locations for sorting and storage.

3 Claims, 4 Drawing Sheets

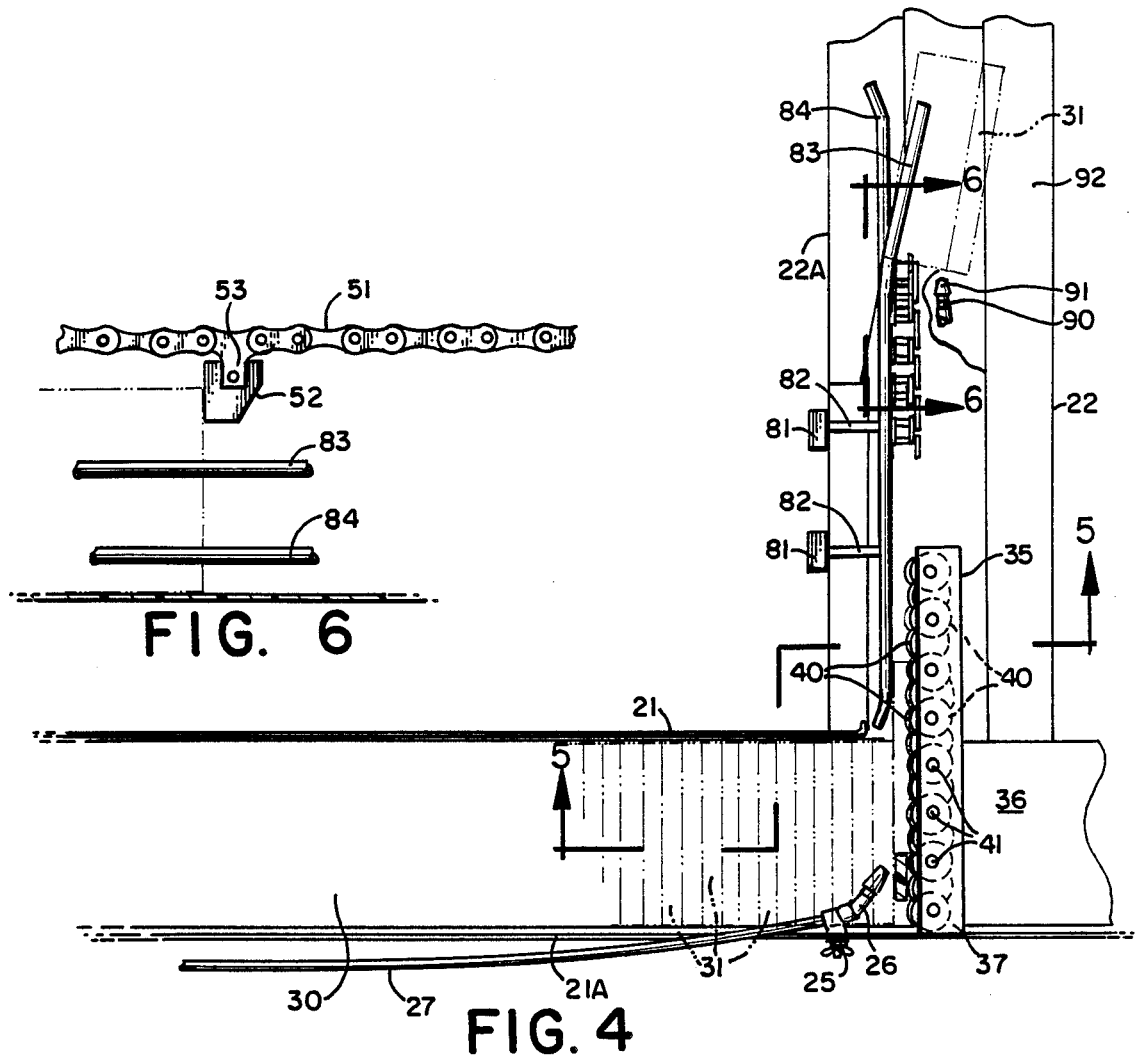
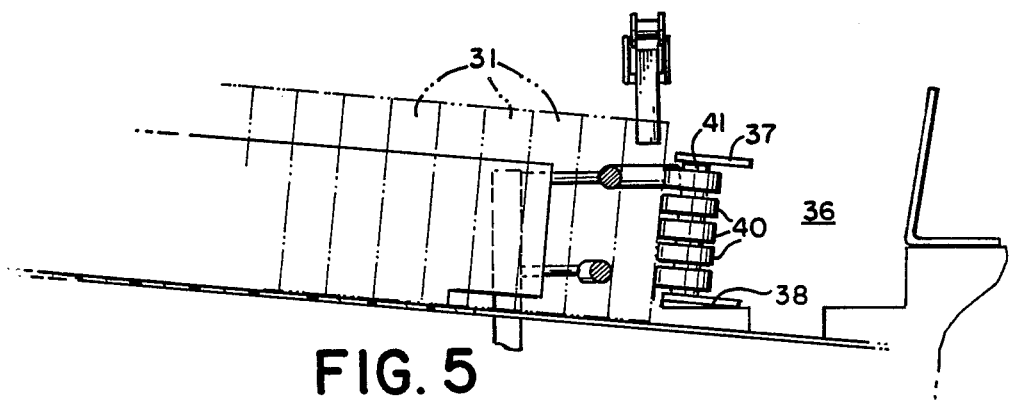

CONVEYOR SYSTEM

CROSS REFERENCE TO RELATED APPLICATIONS

This application is a continuation-in-part of my prior application Ser. No. 06/805,872, filed Dec. 6, 1985, entitled "Conveyor System", and now abandoned.

BACKGROUND OF THE INVENTION

1. Field of the Invention

This invention relates to a conveyor system of the type which has two or more endless belts in intersecting relation at a transition area, the first of which receives the articles in one position, and at the transition area the position of each of the articles is changed to another position, prior to being deposited upon and transported on the second endless belt to locations for sorting and storage.

2. Description of the Prior Art

One of the problems associated with the transportation and storage of small containers, such as boxed tape cassettes, is that such cassettes are received in cartons, which cartons may include a variety of titles of tapes, or single titles, all of which must be sorted as to title and then stored. Boxed tape cassettes are typically marked on the exterior of the carton with indicia, such as a bar code, which is electronically read for tape sorting and subsequent storage. One typical available conveyor system moves the tape casettes along in front of a quantity of storage bins with the codes being read, and the tapes moved off the conveyor at the proper bin. This system, however, requires that the casettes be manually placed on a conveyor belt in proper sequence and properly aligned for reading, which operation due to the tremendous quantity of tapes being handled is cost prohibitive. Examples of prior art systems which orient articles such as boxes are shown in the U.S. Pat. Nos. 1,444,919 to Hay; 2,499,694 to Stenger; 3,776,344; to Harrison; and 4,193,491 to James et al. but none of these systems performs the desired operations.

The conveyor system of my invention receives the tapes from boxes onto a first conveyor belt, in stacks, on edge, and moves them to another location where their orientation is changed to a face down flat position for deposition on a second conveyor belt. The second belt then transports the cassettes in front of storage bins, where the bar code can be read and the tapes removed to the various bins according to their coding.

SUMMARY OF THE INVENTION

A conveyor system having an endless belt for receiving stacks of articles for sorting, advancing the articles to a transition area and picking off the articles one at a time in a rapid well spaced manner, changing the position of the articles, and depositing the articles on an intersecting endless belt and transporting the articles to locations for sorting and storage.

The principal object of the invention is to provide a conveyor system that receives stacks of articles in one position on a conveyor belt, transports and changes the orientation of the articles, deposits them on a second belt and then transports and delivers the articles to a plurality of storage bins at a high rate of speed.

A further object of the invention is to provide a conveyor system of the character aforesaid which transports articles without damage.

A further object of the invention is to provide a conveyor system of the character aforesaid which is simple and inexpensive to construct but durable and long lasting in operation.

A further object of the invention is to provide a conveyor system of the character aforesaid which can be used with a wide variety of articles.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

FIG. 4 is a horizontal secitonal view taken approximately on the line 4—4 of FIG. 3;

FIG. 5 is a vertical sectional view taken approximately on the line 5—5 of FIG. 4;

FIG. 6 is a vertical sectional view taken approximately on the line 6—6 of FIG. 4;

Figure 1:
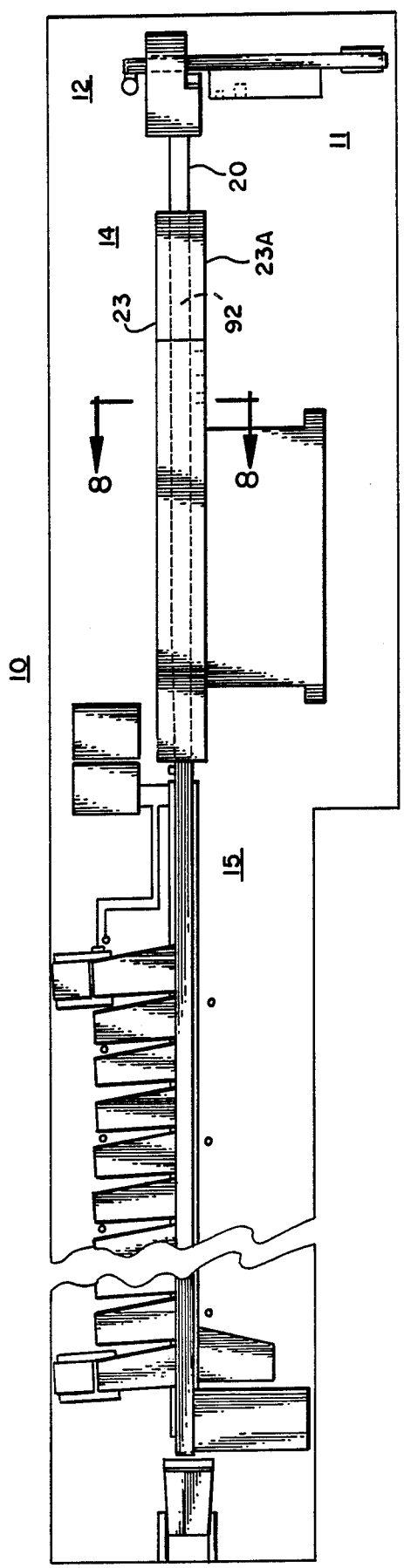
FIG. 1 is a top plan view of the complete conveyor system which incorporates the invention therein.
Figure 2:
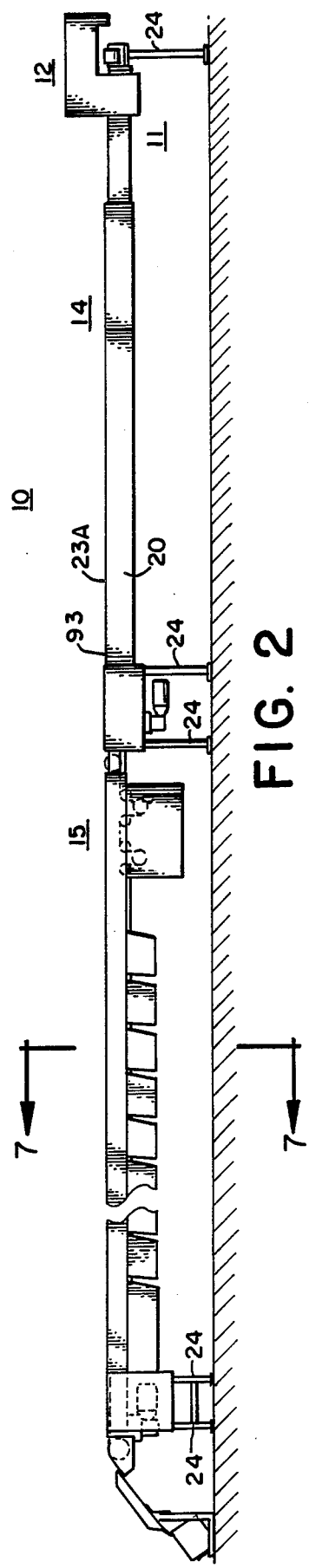
FIG. 2 is a side elevational view of the system of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings and FIGS. 1 to 9 thereof a conveyor system 10 is therein illustrated, which includes a receiving area 11, a transition area 12, a transporting area 14 perpendicular to the area 11, and an unloading and storage area 15 in line with the area 14.

The conveyor system 10 includes a frame 20 with several connected sets of side rails 21, 21A, 22, 22A, 23, 23A and vertical supporting posts 24.

The system at the receiving area 11 includes a first endless conveyor belt 30 carried between the side rails 21, 21A and driven by rollers (not shown) journaled in bearing 25, for advancing of articles, (boxed tape cassettes 31 being illustrated) to the transition area 12. The side rail 21A has a bracket 25A secured thereto and mounts a nozzle 26, which is connected by hose 27 to a source of air under pressure (not shown). The transition area 12 includes an upper frame 32 of rectangular configuration which is located above the side rails 21, 21A, 22 and 22A by vertical support rails 33, which are secured to the side rails 21A and 22A to support the frame 32.

The frame 32 has a vertical plate 35 connected thereto which extends downwardly to a roller plate assembly 36, which includes upper and lower plates 37 and 38, a rear mounting plate 39 connected to plates 37, 38 and to plate 35. A plurality of stacked rollers 40 are provided alternately spaced and mounted on shafts 41, which shafts extend between plates 37 and 38 and with the rollers provides a stop and transition surface for the casettes 31.

The upper frame 32 carries shafts 44 and 45 in bearings (not shown) mounted to and below frame 32 and driven through a drive train (not shown). The shafts 44 and 45 have sprockets 50 thereon of well known type, which engage a first endless driven chain 51 of well known type, and which chain is provided with one or more (four being shown) of pusher elements 52 which are secured to the chain 51 by brackets 53. The pusher elements are of a generally triangular configuration and preferably formed of nylon or other durable wear resistant material. The upper frame 32 has two bearing blocks 55 thereon with a shaft 56 journaled therebetween, with a gear 57 thereon which has a timing belt 58 engaged therewith, and which extends to another gear (not shown) to drive the timing belt 58. The shaft 56 at the end opposite to gear 57 has a disc 60 thereon, which has an opening 61 and is in front of an electric eye (not shown) which projects a light beam for interruption of the light beam and thereby monitors the revolutions of the disc 60. The timing belt 58 extends to an electric clutch gear 65 carried on a shaft 66 journaled in bearings 67, carried on upper frame 32, with a sprocket 68 on the shaft 66 engaged by an endless chain 69, which is engaged with a sprocket 70 carried on shaft 71, journaled in bearings 72 on frame 32. The shaft 71 is driven from below (not shown) in sychronization with the pusher element 91 as described below.

An emergency stop button 73 is provided mounted on frame rail 21, which is effective to stop movement of pusher elements 52 as described below.

Figure 9:
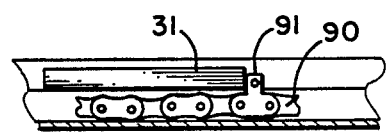
FIG. 9 is a fragmentary vertical sectional view taken approximately on the line 9—9 of FIG. 8 and illustrating one form of pusher element for boxed tape cassettes and record albums and other items.

If the emergency stop button 73 is pressed, the clutch gear 65 disengages stopping further motion of chain 51. It is important upon re-start of chain 51 (by resetting the emergency stop button 73) that pusher elements 52 get back in exact synchronization with pusher element 91 as shown in FIG. 9. The disc 60 and photo eye interact so that the clutch gear 65 engages at the proper instant, with the result that pusher element 52 is in synchronization with pusher element 91.

Figure 3:
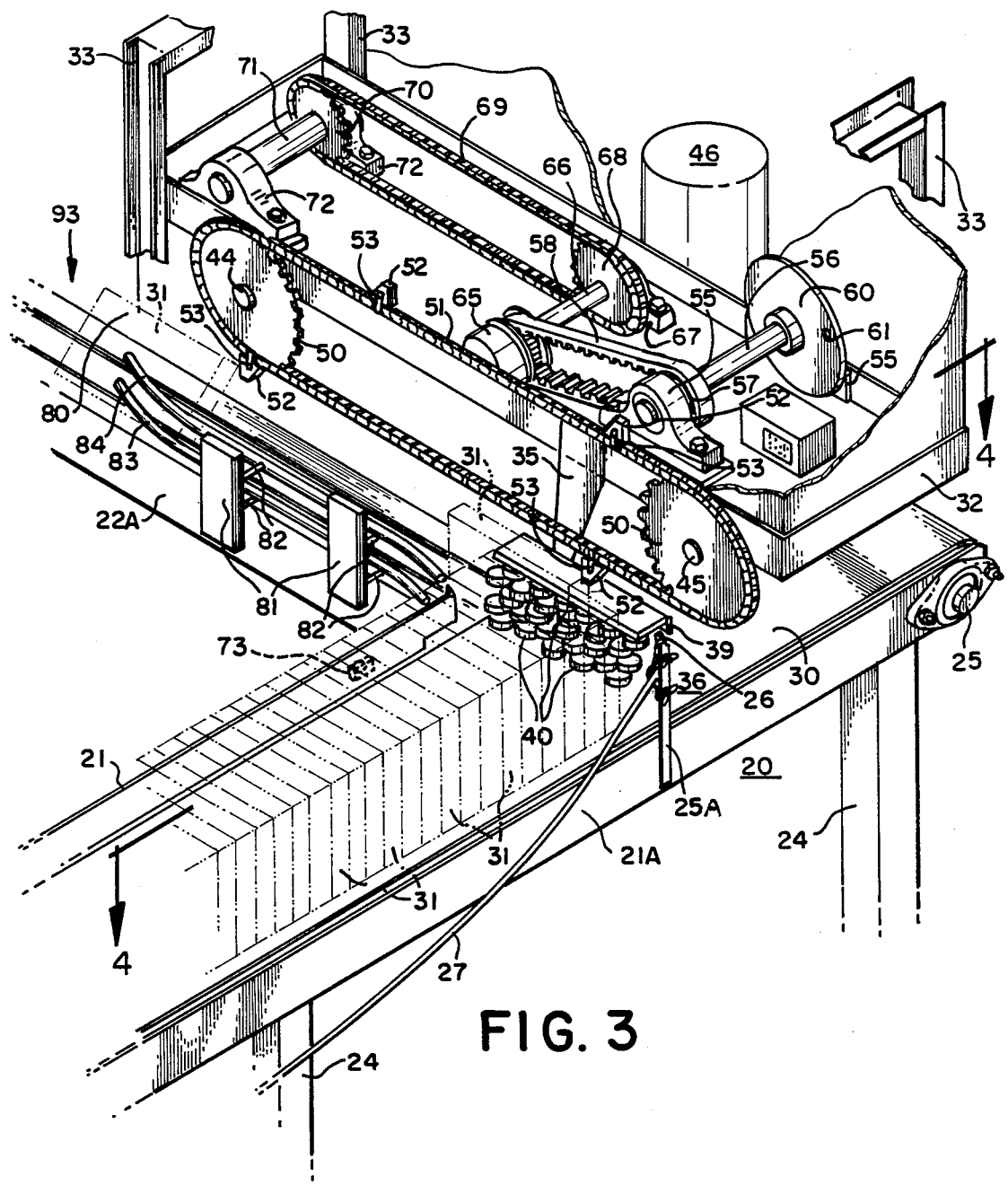
FIG. 3 is a fragmentary perspective view, enlarged and partially broken away, illustrating a portion of the system of FIG. 1.
Figure 7:
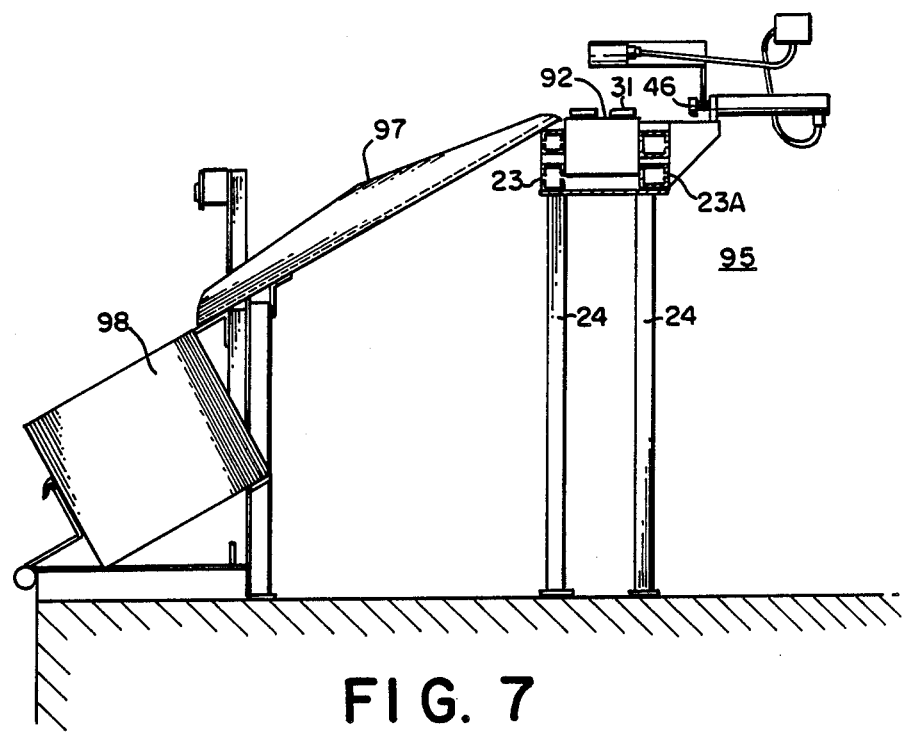
FIG. 7 is a vertical sectional view taken approximately on the line 7—7 of FIG. 2 illustrating a single unloading and storage station of the system.

The transition section 12 adjacent to the roller plate assembly 36 is provided with a flat horizontal surface 80 adjacent the roller plate assembly 36, at the same level as the belt 30, and extending between side rails 22 and 22A. The side rail 22A adjacent roller plate assembly 36 has two plates 81 engaged therewith, extending vertically upwardly, with rods 82 attached thereto extending inwardly over surface 80, of a transporting area 14 and carrying spaced curved fingers 83 and 84 which extend horizontally along and above the surface 80. The fingers 83 and 84 take a cassette 31 in upright position as shown in FIG. 3, and orient it to a flat face down position onto surface 80, as shown in FIG. 4 to be described below.

A second endless driven chain 90 is provided below the surface 80 with upright pusher elements 91 thereon, which pusher elements 91 can be of the same construction as elements 52. The pusher elements 91 engage a cassette 31 which is on its face and urge it along surface 80 away from fingers 83 and 84 until it is deposited onto a second endless conveyor belt 92. The second endless conveyor belt 92 is similar to belt 30, is carried on driving rollers (not shown) and continues on surface 80 along and onto a surface 93 of the unloading and storage area 15. The area 15 is provided with a plurality of sorting and unloading stations 95 along which belt 92 moves, one of which stations is shown in detail in FIG. 7. The stations 95 each include a sensing device such as a photo cell which indicates the exact location of the boxed cassette so that an unloading device 96 is activated at the proper time and pushes the cassette 31 off the belt 92 onto an inclined chute 97, which carries it down to a storage bin 98 of well known type. The remaining cassettes 31 continue along the belt 92 until they reach their respective stations where they are also removed in like manner.

Figure 8:
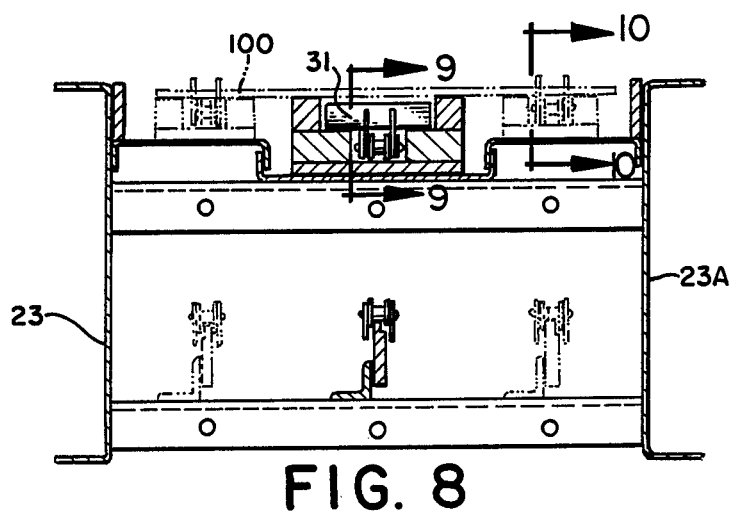
FIG. 8 is a vertical sectional view taken approximately on the line 8—8 of FIG. 1.
Figure 10:
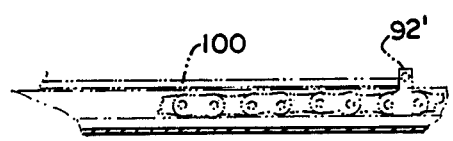
FIG. 10 is a fragmentary vertical sectional view taken approximately on the line 10—10 of FIG. 8 illustrating an alternate form of pusher element for record albums.

Referring now more particularly to FIGS. 8-10 the machine if desired can be provided with an alternative transporting area 15 which is suitable for transporting phonograph albums 100. As seen in FIG. 8 the machine can be provided with a series of additional pusher elements 92', which are at a different height than elements 92 and can engage and transport phonograph albums 100 as described for the cassettes 31.

It will thus be seen that apparatus has been provided with which the objects of the invention are achieved.

I claim:

1. A conveyor system for transporting articles having coded indicia thereon which comprises
   a receiving area for receiving stacks of articles;
   said receiving area includes a pair of side rails with a driven conveyor belt therebetween onto which the articles are placed;
   a transition area for picking off the article one at a time and changing their orientation;
   said transition area includes a pair of side rails with a horizontal surface therebetween; and
   stop and transition means against which said articles are propelled;
   an upper frame above said transition area horizontal surface;
   said stop and transition means includes a plurality of stacked rollers alternately mounted on shafts;
   said shafts being mounted to a vertical plate carried by said upper frame; and
   a source of air under pressure directed against said articles adjacent said stop means;
   said transition area includes a first driven chain carried on said upper frame and having pusher elements in selective contact with at least one of said articles which is against said stacked rollers;
   at least two spaced fingers attached to said transition area side rail and extending therealong;
   said fingers being curved so that they receive an article in one position and turn it 90° to a new orientation as it is moved therealong; and
   a second driven chain in synchronized operation with said first driven chain below said transition area surface having upwardly extending pusher elements to engage said oriented article;
   a transporting area which receives the articles from the transition area;
   an unloading and storage area which receives the articles from the transporting area; and said unloading area includes a plurality of stations where said articles are sorted by said coded indicia and removed for storage.

2. A conveyor system as defined in claim 1 in which said stations include a reader to read said coded indicia on said articles and select articles for a particular station;

means to remove said selected articles from said second conveyor belt at said station; and storage bins to receive said selected articles.

3. A conveyor system as defined in claim 1 in which said transporting area is in perpendicular relation to said receiving area and extends from said transition area to receive articles therefrom;

said transporting area including a pair of side rails with a horizontal surface therebetween; and a second endless conveyor belt on which said oriented articles are placed by said second driven chain pusher elements.

* * * * *